(12) United States Patent
Potter

(10) Patent No.: US 10,611,294 B2
(45) Date of Patent: Apr. 7, 2020

(54) FRONT LIGHTING SYSTEMS AND METHODS

(71) Applicant: Valeo North America, Inc., Troy, MI (US)

(72) Inventor: Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/023,614

(22) Filed: Jun. 29, 2018

(65) Prior Publication Data

US 2020/0001776 A1    Jan. 2, 2020

(51) Int. Cl.
*B60Q 1/14* (2006.01)
*F21S 41/657* (2018.01)

(52) U.S. Cl.
CPC .......... *B60Q 1/1423* (2013.01); *F21S 41/657* (2018.01); *B60Q 2300/056* (2013.01)

(58) Field of Classification Search
CPC .... F21S 41/657; F21S 41/60; F21W 2102/00; B60Q 1/1423; B60Q 2300/056; B60Q 2300/42; B60Q 1/04
See application file for complete search history.

(56) References Cited

U.S. PATENT DOCUMENTS

| | | | |
|---|---|---|---|
| 8,979,336 B2 * | 3/2015 | Yamamura | B60Q 1/085 362/507 |
| 9,074,745 B2 * | 7/2015 | Lee | B60Q 1/0041 |
| 9,140,424 B2 * | 9/2015 | Mochizuki | B60Q 1/143 |
| 9,550,448 B2 * | 1/2017 | Tanaka | F21S 41/143 |
| 9,751,455 B2 * | 9/2017 | Nakatani | B60Q 1/1423 |
| 10,414,327 B2 * | 9/2019 | Brede | B60Q 1/1415 |
| 2008/0112173 A1 | 5/2008 | Dassanayake et al. | |
| 2008/0239746 A1 * | 10/2008 | Wuller | B60Q 1/085 362/538 |
| 2009/0190323 A1 | 7/2009 | Watanabe et al. | |
| 2011/0012510 A1 | 1/2011 | Tani et al. | |
| 2012/0275173 A1 | 11/2012 | Hamm et al. | |
| 2018/0031200 A1 * | 2/2018 | Park | B60Q 1/143 |

FOREIGN PATENT DOCUMENTS

EP    3 028 897 A1    6/2016

* cited by examiner

*Primary Examiner* — Peggy A Neils
(74) *Attorney, Agent, or Firm* — Oblon, McClelland, Maier & Neustadt, L.L.P.

(57) ABSTRACT

A headlamp assembly, an adaptive front-lighting system, and a method for generating a hybrid luminous intensity distribution are provided. The headlamp assembly includes a light module configured to emit a first luminous intensity distribution and a supplementary module configured to emit a second luminous intensity distribution which at least partially overlaps with the first luminous intensity distribution. The second luminous intensity distribution includes pluralities of independently controlled zones.

20 Claims, 13 Drawing Sheets

FRONT LIGHTING SYSTEMS AND METHODS

BACKGROUND

Motor vehicles contain numerous lighting devices for both interior and exterior illumination. For example, exterior, vehicle lighting devices may perform stop lamp functions, tail lamp functions, headlamp functions, daytime running light functions, dynamic bending light functions, and fog lamp functions. Numerous studies have found that nighttime visibility is a key to highway safety.

In an effort to improve vehicle and pedestrian safety, most governments promulgate some form of safety regulations that specify motor vehicle lighting performance requirements. This helps to ensure adequate illumination of the roadway and enhance the visibility of motor vehicles on the roads so that their presence is perceived and their signals are understood in daylight, in darkness, and in conditions of reduced visibility.

The Insurance Institute for Highway Safety (IIHS) in the United States has its own set of tests and ratings (Headlight Test and Rating Protocol) for headlamp performance. The IIHS tests and ratings seek to encourage manufacturers to improve the illumination performance in actual on-road use. IIHS evaluations have shown that the on-road illumination provided by vehicle headlamps varies widely. In addition, IIHS has rated the majority of headlamps in a poor category (e.g. insufficient illumination, excessive glare, etc.). The IIHS testing protocol tests headlamp for 5 curve conditions: 1/150 meter radius Left curve, 2/250 meter radius Left curve, 3/Straight roadway, 4/250 meter Right curve, and 5/150 meter Right curve.

It is prudent for vehicle manufacturers to design vehicle lighting devices which meet the technical requirements of various standards around the world and in particular, in their associated marketing regions. In recent years, vehicle lighting has also become important for its aesthetic appeal to consumers.

Some vehicles are equipped with adaptive driving beams (ADB) that use an array of overlapping beam sections, also known as pixels, to form a composite beam pattern. The pixels or groups of pixels are turned off to form a dark tunnel which can be placed over or aligned with an oncoming vehicle.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

In one aspect, the present disclosure relates to a headlamp assembly. The headlamp includes a light module and a supplementary module. The light module is configured to emit a first luminous intensity distribution. The supplementary module is configured to emit a second luminous intensity distribution which at least partially overlaps with the first luminous intensity distribution. The second luminous intensity includes pluralities of independently controlled zones.

In one aspect, the pluralities of independently controlled zones are controlled based on a rotation of the first luminous intensity distribution and a location of regulatory points.

In one aspect, a plurality of controlled zones is non-illuminated when the plurality of controlled zones overlaps with the location of one or more regulatory points.

In one aspect, the first luminous intensity distribution differs from the second luminous intensity distribution.

In one aspect, the first luminous intensity distribution includes a maximum intensity hot spot region.

In one aspect, the first light module is adapted to generate a beam pattern with a kink.

In one aspect, the first light module is a low beam module.

In one aspect, the first light module is configured to generate a low beam pattern.

In another aspect, the present disclosure relates to an adaptive front-lighting system. The adaptive front-lighting system includes a first light module configured to generate a first beam pattern and a supplementary module configured to generate a second beam pattern which at least partially overlaps with the first beam pattern. The second beam pattern includes pluralities of independently controlled zones.

In another aspect, the present disclosure relates to a method for generating a hybrid luminous intensity distribution, including emitting a first luminous intensity distribution via a light module; emitting a second luminous intensity distribution via a supplementary module, the second luminous intensity distribution at least partially overlapping with the first luminous intensity distribution and having pluralities of independently controlled zones; and controlling based on a rotation of the first luminous intensity distribution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Figure 1A:
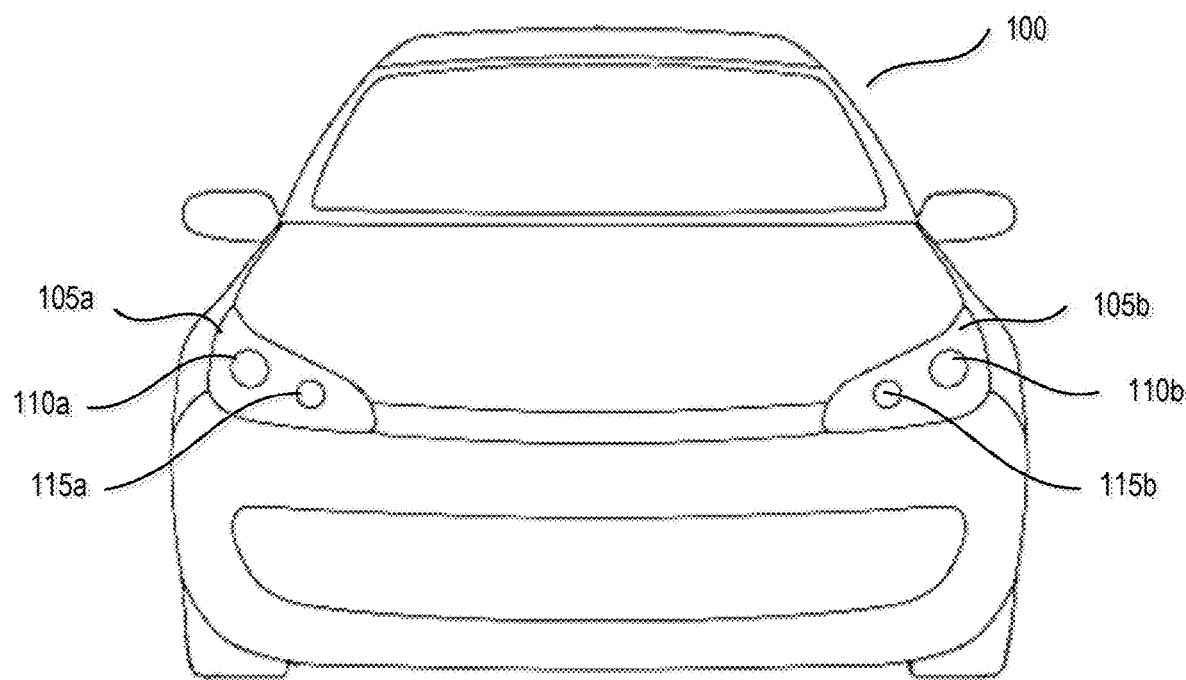
FIG. 1A illustrates a front-end of an exemplary motor vehicle according to one embodiment.

FIG. 1A illustrates a front-end of an exemplary motor vehicle 100. Motor vehicle 100 includes two headlamp assemblies 105a and 105b. Typically, headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction.

Figure 1B:
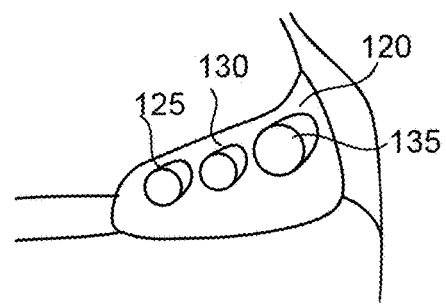
FIG. 1B illustrates a headlamp assembly according to one embodiment.

FIG. 1B illustrates a headlamp assembly 120 according to one embodiment. The headlamp assembly 120 includes a high beam headlamp 125, a supplementary pixel module 130, and a low beam headlamp 135 including an Adaptive Front-lighting System (AFS).

Figure 2:
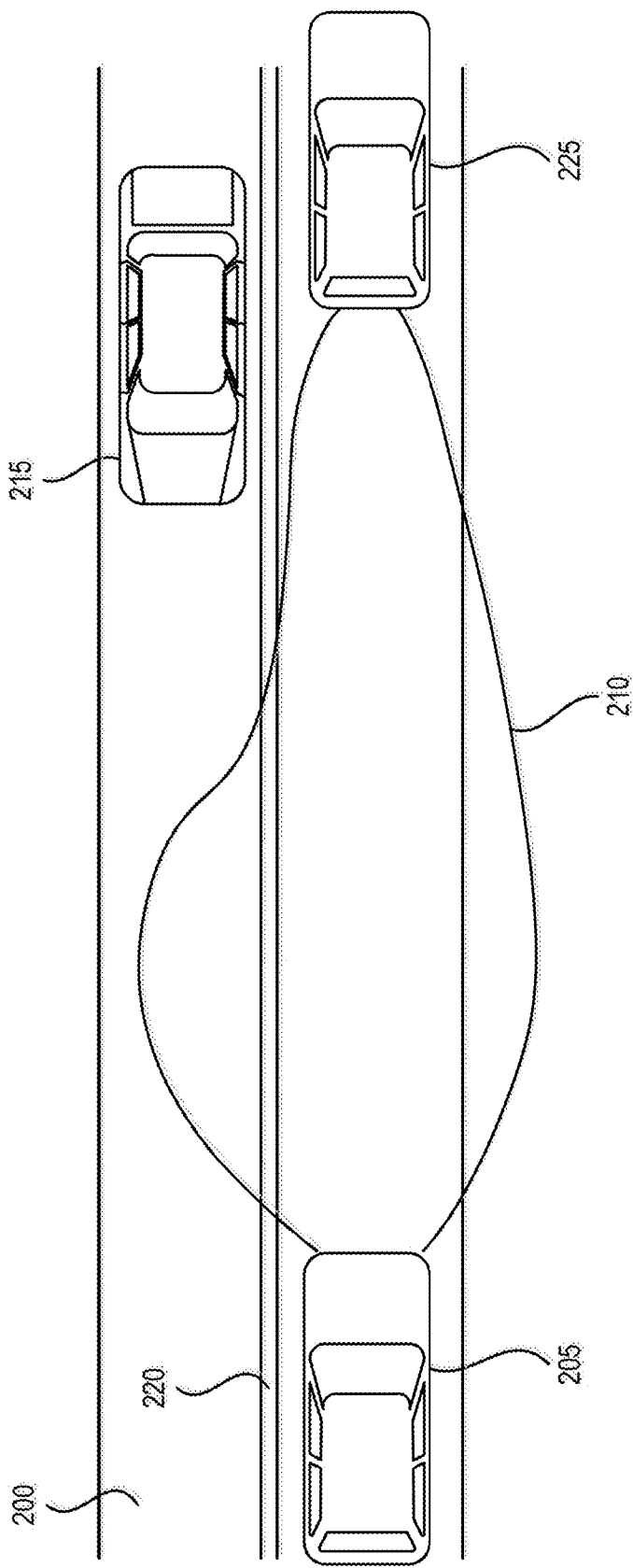
FIG. 2 is a schematic diagram of an exemplary roadway, a motor vehicle, and a light distribution pattern according to one embodiment.

FIG. 2 is a schematic diagram of an exemplary roadway 200, motor vehicle 205, and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction. Further, Adaptive Front-lighting System illuminates the traveling direction when driving on a curved road.

Figure 3:
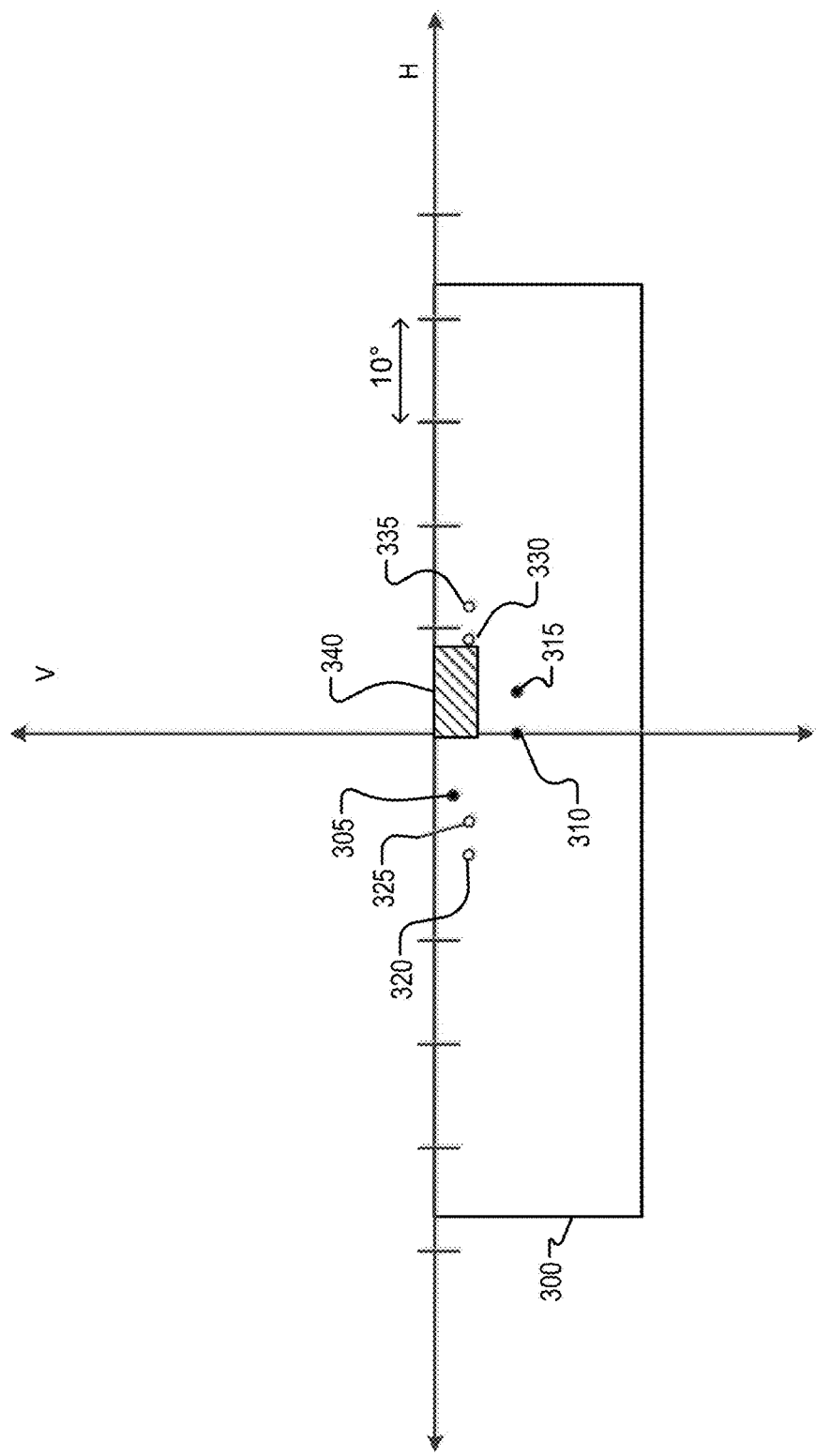
FIG. 3 illustrates an exemplary luminous intensity distribution of a low beam light according to one embodiment.

FIG. 3 illustrates an exemplary luminous intensity distribution 300 of a typical low beam headlamp as seen or measured at a screen spaced from, and parallel to, the front (emitting) face of the headlamp. A horizontal axis H and vertical axis W are shown overlaid on luminous intensity distribution 300 in FIG. 3. The horizontal axis H and vertical axis V identify horizontal and vertical planes intersecting both the center of the headlamp and the screen.

Most states, countries, or regions which utilize motor vehicles have various requirements and standards that a vehicle must adhere to in order to legally use roadways. For example, Federal Motor Vehicle Safety Standard (FMVSS) No. 108 specifies various maximum and minimum photometric intensity values (based on angle) for headlamps on vehicles operated within the Unites States.

Point 305 in FIG. 3 is a key measurement location (i.e., FMVSS 108 regulatory point), defined by the FMVSS No. 108 standard, for ensuring that a low beam headlamp does not dazzle the driver of an oncoming, motor vehicle. Point 305 is located 3.5° to the left of the vertical axis V and 0.86° below the horizontal axis H. To meet the requirements of FMVSS No. 108, a headlamp low beam must have a luminous (photometric) intensity below a specified threshold (12,000 cd) at point 305. FMVSS No. 108 also specifies a minimum luminous intensity at other points on the <luminous intensity distribution 300.

Point 310 in FIG. 3 is a second key measurement location. Point 310 is located on the vertical axis V and 4° below the horizontal axis H. To meet the requirements of FMVSS No. 108, a headlamp high beam must have a luminous (photometric) intensity below a specified threshold (12,500 cd, for example) at point 310. Point 315 in FIG. 3 is a third key measurement location. Point 315 is located 4° to the right of the vertical axis V and 4° below the horizontal axis H. To meet the requirements of FMVSS No. 108, a headlamp low beam must have a luminous (photometric) intensity below a specified threshold (12,000 cd) at point 315.

Points 320, 325, 330, and 335 in FIG. 3 are IIHS detector locations according to one example. Point 320 is related to the 150 m Left curve, point 325 is related to the 250 m Left curve, point 330 is related to the 250 m Right curve, and point 335 is related to the 150 m Right curve. The exact angular location can vary depending on lamp mounting height, lamp separation, and other factors. The headlamp provides a hot spot region 340 to provide adequate light at a distance down the road. A hot spot region can be defined as a region having maximum intensity (candela). The hot spot region has a small aperture vertical height (with respect to the vertical location of the maximum intensity), wherein the hot spot region is concentrated and/or has an increased maximum intensity near the horizon. A higher maximum intensity can be achieved, but when it is located at approximately 2.0 degrees vertically, there may not be as much projection down the road or near the horizon. A key design challenge is how to add light to points 325 and 320 for improved IIHS visibility without adding too much light too point 305 which has a maximum 12000 cd.

Figure 4:
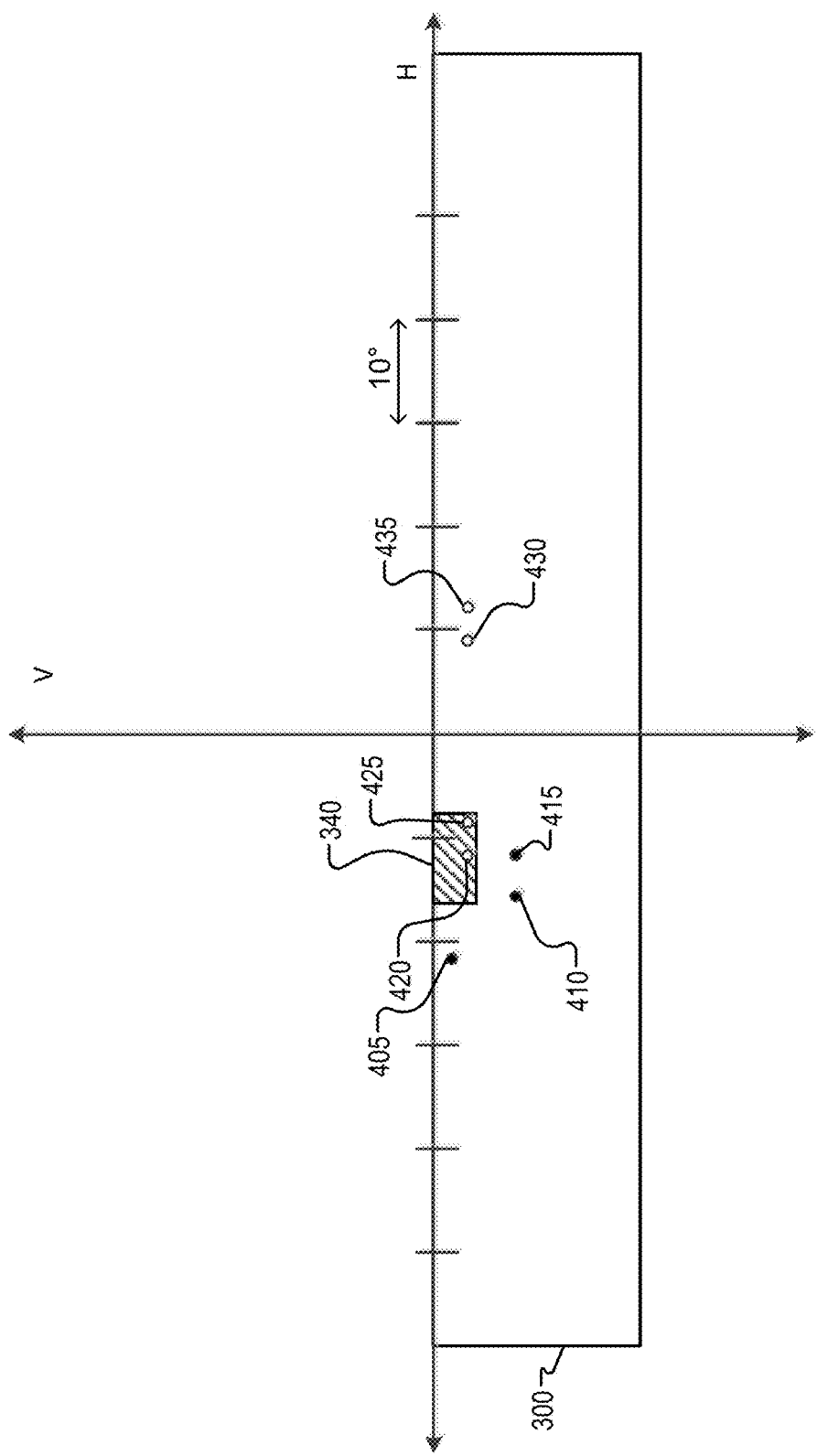
FIG. 4 illustrates an exemplary luminous intensity distribution of the low beam headlamp with a 15 degrees adaptive front-lighting system (AFS) rotation according to one example.

FIG. 4 illustrates an exemplary luminous intensity distribution 400 of a low beam headlamp similar to that shown in FIG. 3 according to one example with the addition of LB rotation, known commonly as 'AFS' or 'DBL' (Dynamic Bending Light).

During AFS the low beam rotates. The key regulatory measurement locations are referenced to the lamp optical axis. Therefore, when the low beam rotates the key regulatory measurement locations moves with the beam pattern. Points 405, 410, and 415 are the first, second, and third key measurement locations corresponding to points 305, 310, and 315 when the low beam rotates. The IIHS detector locations are referenced to the vehicle direction axis, so the IIHS detector locations do not move with the beam. The detectors are fixed relative to the car direction. Points 420, 425, 430, and 435 in FIG. 4 are the IIHS detector locations. The AFS rotation moves the hot spot 340 over IIHS target (i.e., detector) helping to reduce visibility demerits. Regulatory points are not impacted compared to the non rotated LB of FIG. 3. FIG. 4 illustrates a 15 degree AFS rotation.

A supplementary module can be combined with the low beam pattern to improve overall performance and illumination (for example, supplementary pixel module 130 of FIG. 1B). Specific pixels of the supplementary module can be turned off so not to exceed the specific threshold associated with the key measurement locations (e.g., 305, 310, 315 of FIG. 3).

Figure 5:
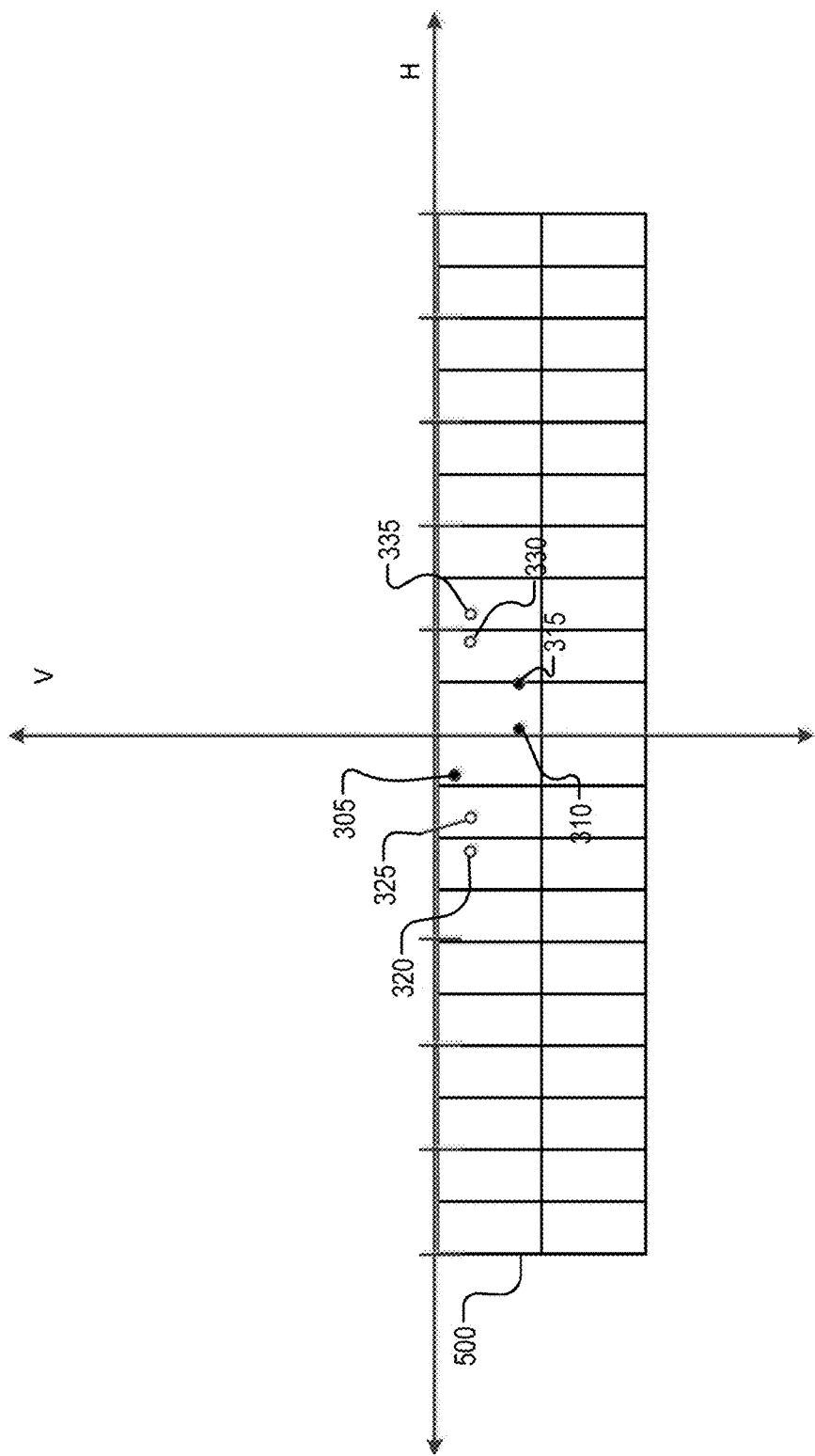
FIG. 5 illustrates an exemplary luminous intensity distribution of a supplementary module.

FIG. 5 illustrates an exemplary luminous intensity distribution 500 of a supplementary module. The supplementary module may generate a beam which includes a large number of pixels which are illuminated independently (e.g., 100 or more pixels). The illumination of each pixel may be generated by at least one light source. The supplementary module may include a matrix of light sources (e.g., light emitting diodes (LEDs)). FIG. 5 shows a pixel size/resolution of 5 degree wide. This resolution is consistent with an array (matrix) of LEDs, but higher resolutions systems using technologies such as digital micromirror device (DMD) or liquid crystal display (LCD) (~0.1 degree as reference only) may also be used.

Figure 6:
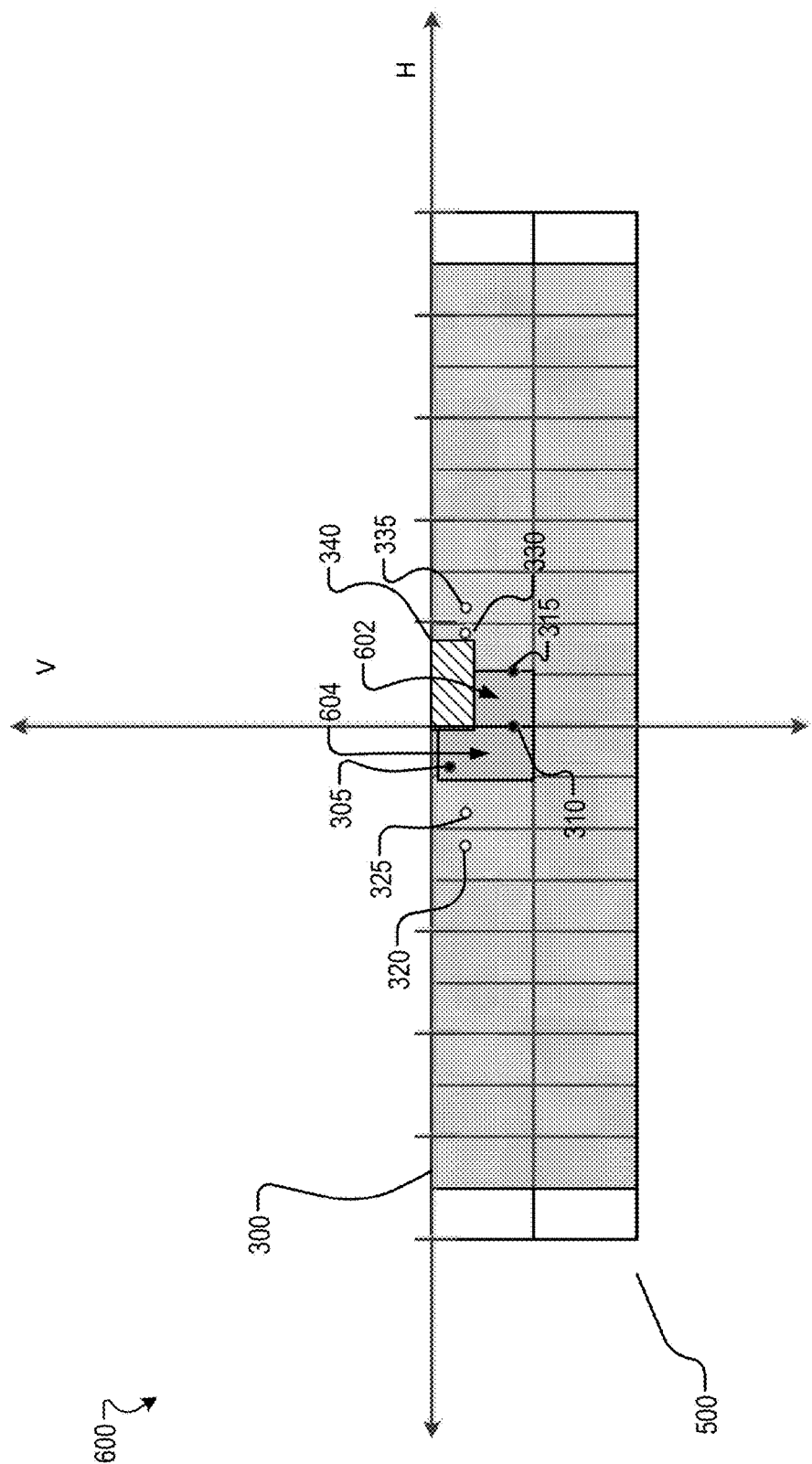
FIG. 6 illustrates an exemplary luminous intensity distribution of the low beam headlamp combined with the supplementary module according to an example.

FIG. 6 illustrates an exemplary luminous intensity distribution 600 of the low beam headlamp combined with the supplementary module at nominal aim. As shown in FIG. 6, pixels 602 and 604 are turned off so not to add light to key regulatory points (i.e., 305, 310, 315). In one example, a supplementary module with a higher resolution may be used. The supplementary module with higher resolution may have more controlled and smaller regions turned 'off'.

Figure 7:
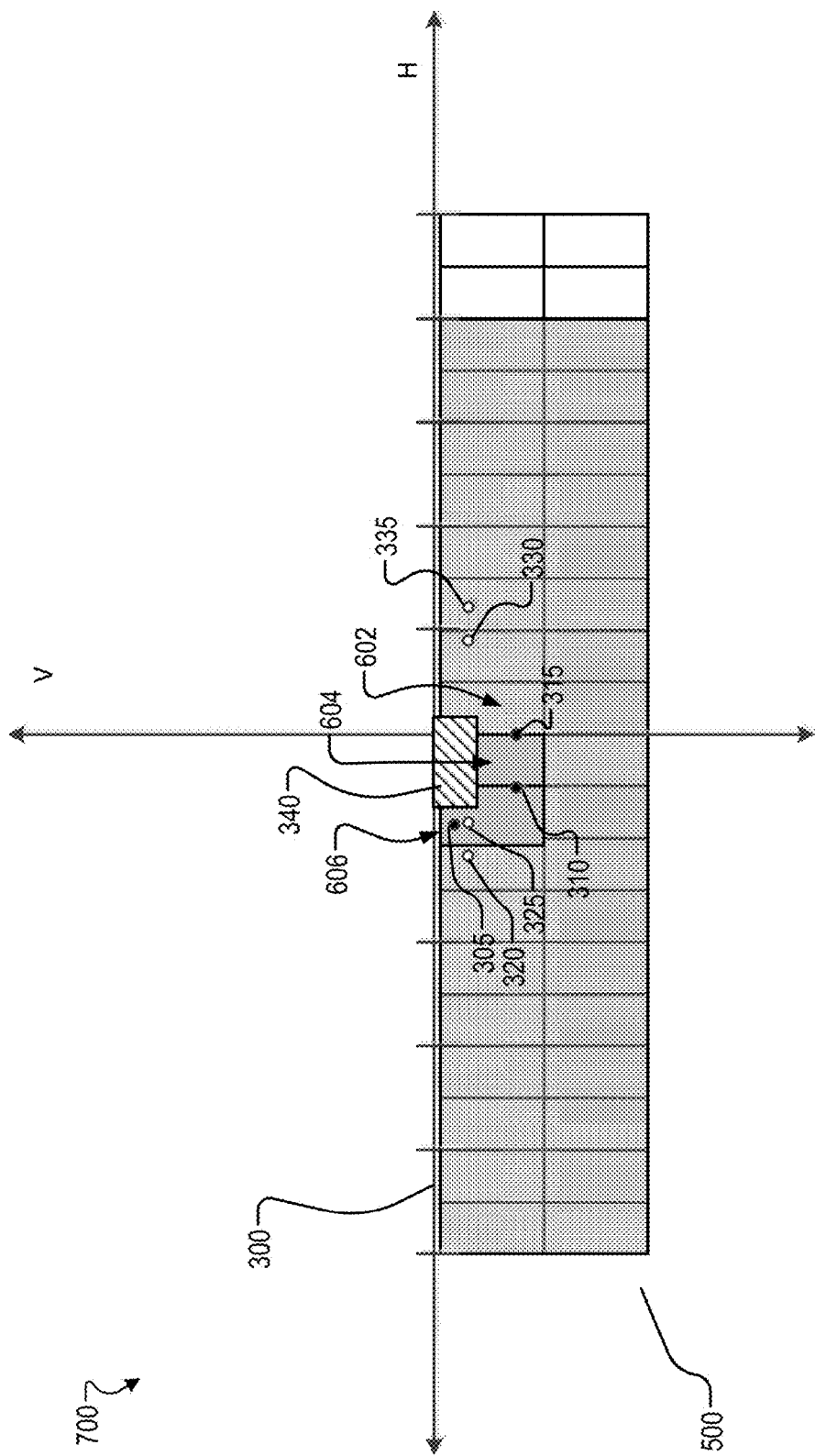
FIG. 7 illustrates an exemplary luminous intensity distribution of the low beam headlamp combined with the supplementary module with a 5 degrees AFS rotation according to one example.
Figure 8:
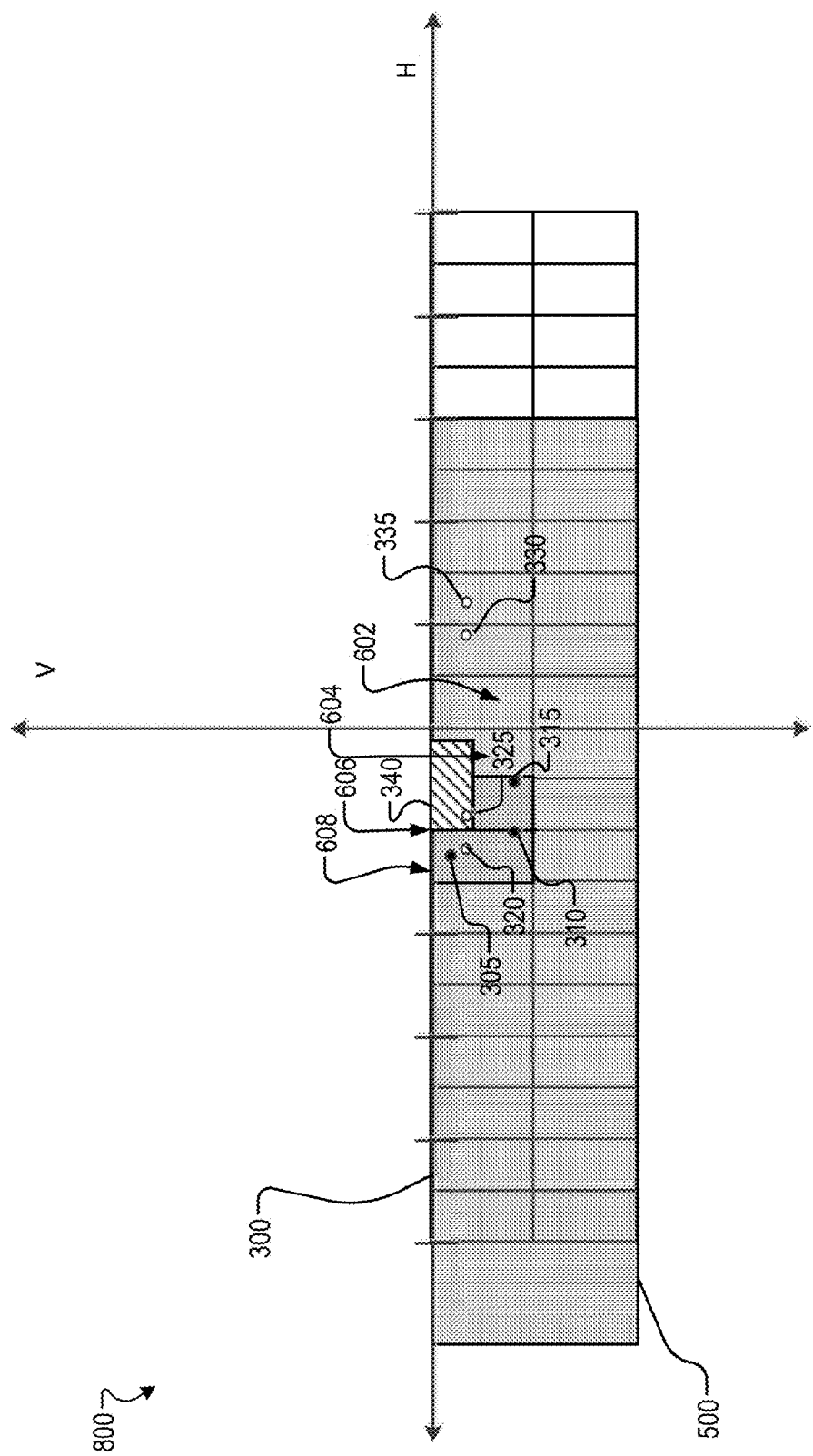
FIG. 8 illustrates an exemplary luminous intensity distribution of the low beam headlamp combined with the supplementary module with a 10 degrees AFS rotation according to one example.
Figure 9:
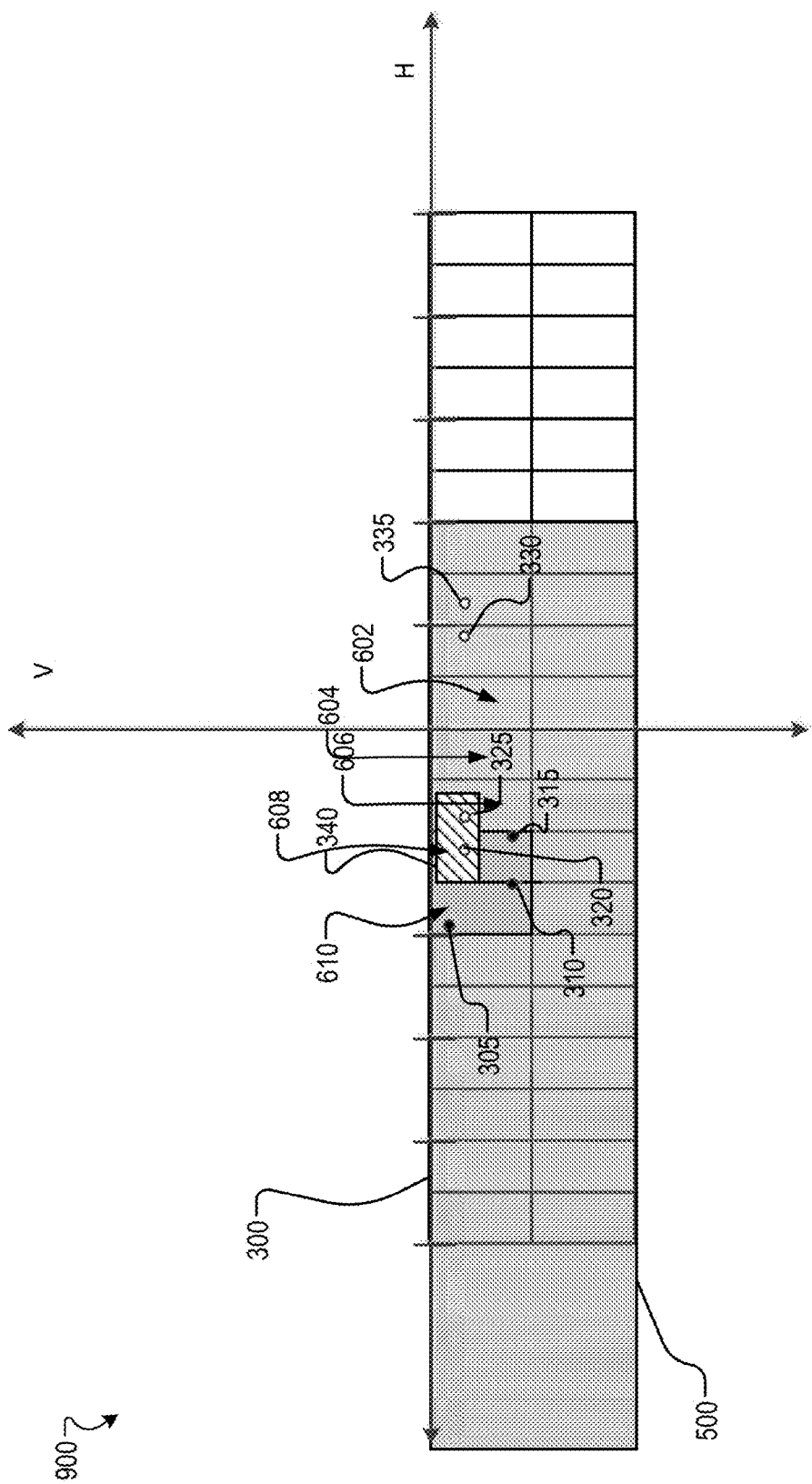
FIG. 9 illustrates an exemplary luminous intensity distribution of the low beam headlamp combined with the supplementary module with a 15 degrees AFS rotation according to one example.

During AFS rotation of the primary module, the pixels or groups of pixels from the supplementary module are turned off to form a dark tunnel over the key regulatory measurement locations. The target zone can be additionally illuminated without exceeding the specified threshold. A higher amount of light can be added to the pattern without negative impact on test points. FIGS. 7-9 illustrate exemplary luminous intensity distribution for different AFS rotation. FIG. 7 shows a 5 degrees rotation, FIG. 8 shows a 10 degrees rotation, and FIG. 9 shows a 15 degrees rotation.

Intensity distribution 700 of FIG. 7 is for the low beam headlamp combined with the supplementary module with a 5 degrees AFS rotation. As the test points have shifted with the rotation, pixels 602 and 604 of the supplementary module are turned on, and pixels 606 and 608 associated with the location of the test points are turned off. Intensity distribution 800 of FIG. 8 is for the low beam headlamp combined with the supplementary module with 10 degrees AFS rotation. Pixel 606 is turned on and pixel 610 is turned off. Pixel 608 remains off. Luminous intensity distribution 900 of FIG. 9 is for the low beam headlamp combined with the supplementary module with 15 degrees AFS rotation. Pixel 610 remains off. Pixel 612 is turned off and pixel 608 is turned on.

In one implementation, the supplementary module may be used with the high beam (HB) headlamps 115a and 115b with AFS. A tunnel is made over H-V (rotated) as not to exceed the SAE H-V maximum (e.g., 75000 cd). The AFS HB may be used with the supplementary module (e.g., pixel module).

In one implementation, the supplementary module (e.g., M×B, Pixel flat) may be used with a rotating light module having a light beam with a kink. In one implementation, the LB is comprised of two contributors, a rotating 'Kink' module (producing a distribution that forms the hot spot and cut-oft), and a pixilated 'Flat' module (producing the wide portion of the beam). The two are combined to form the legal LB pattern.

Figure 10:
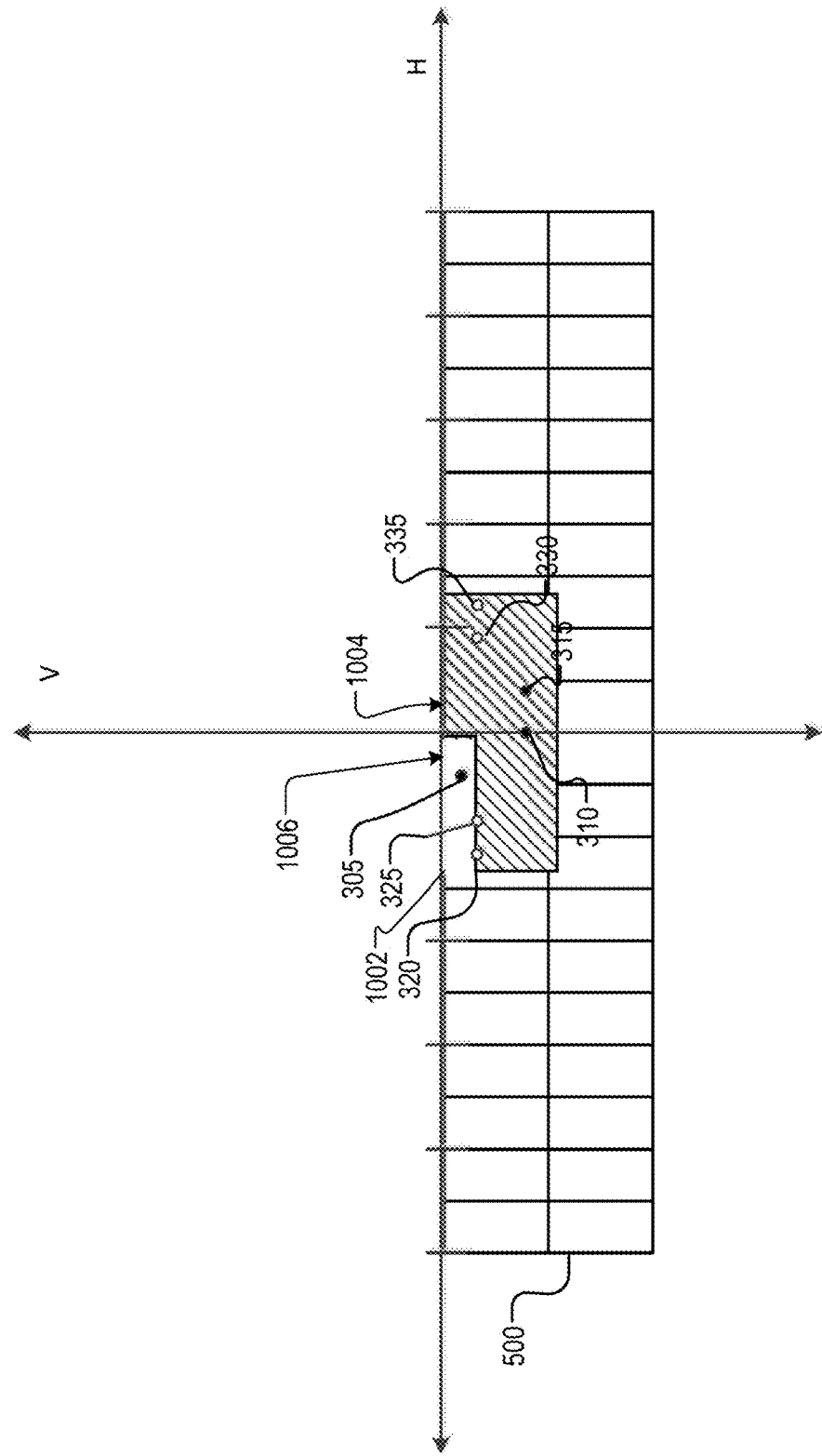
FIG. 10 illustrates an exemplary luminous intensity distribution of a rotating light module having a beam pattern with a kink combined with a pixel flat module at nominal aim according to one example.
Figure 11:
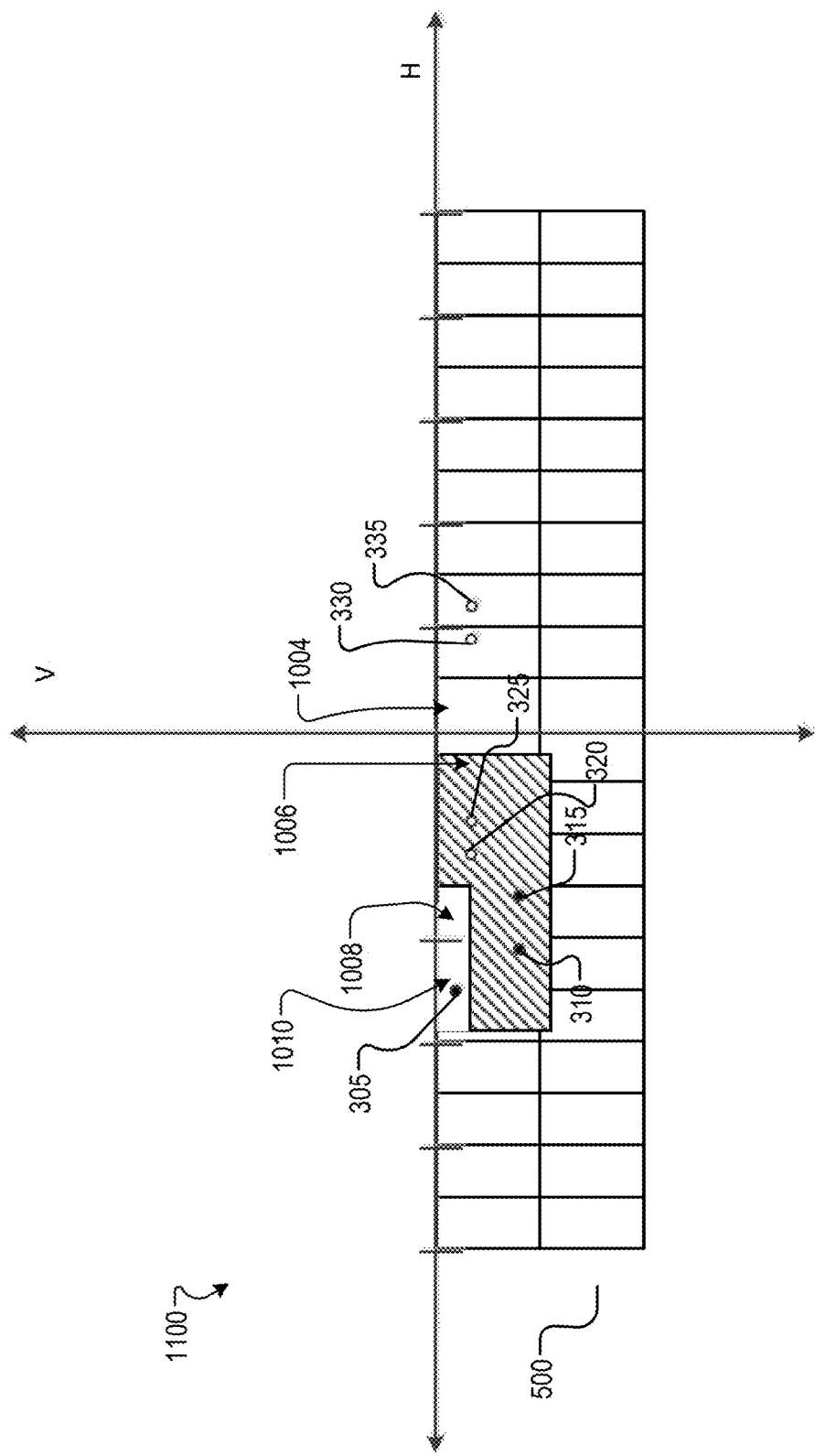
FIG. 11 illustrates an exemplary luminous intensity distribution of the rotating light module having the beam pattern with the kink combined with the pixel flat module with 17 degrees AFS rotation according to one example.

FIG. 10 illustrates an exemplary luminous intensity distribution 1000 of a rotating kink module (e.g., for SAE VOR cutoff) combined with a pixel flat module at nominal aim according to one example. A slight oblique shift or "kink" is present in the upper portion of the target zone as also required by the regulations in force. In some embodiments, the notch 1002 reduces the light emission around the point 305 of FIG. 3 that is located 3.5° to the left of the vertical axis V and 0.86° below the horizontal axis H. The notch 1002 can allow headlamp assembly 105a and 105b to yield improved IIHS ratings, while still meeting the requirements of FMVSS No. 108. In some embodiments, notch 1002 can be located substantially to the left of vertical axis V. In other embodiments, notch 1002 can be positioned symmetrically around the vertical axis V. Placement of the notch is generally dependent on the particular safety requirements and user preferences that do not conflict with the safety requirements. Pixels 1004 and 1006 of the supplementary module may be turned off to limit intensity as key at key regulatory measurement locations (e.g., 305, 310, 315) are covered by pixel 1004 and pixel 1006. When the Kink module is rotated, additional illumination from the Kink hot spot is provided to IIHS targets points 320 and 325, pixels 1004 and 1006 can be turn 'on', and pixels 1008 and 1010 can be turned 'off' to limit intensity at the regulatory locations 305, 310 and 315 as shown in the exemplary luminous intensity distribution 1100 of FIG. 11. In general the combinations of a rotating Kink or LB module with a supplementary pixel beam can maximize illumination on IIHS target locations, while limiting illumination to regulatory locations (keep intensity below a maximum limit. FIG. 11 shows a 17 degrees left rotation of the primary distribution. In one example, the kink may rotate up to 17 degrees outboard and 7 degrees inboard.

Figure 12:
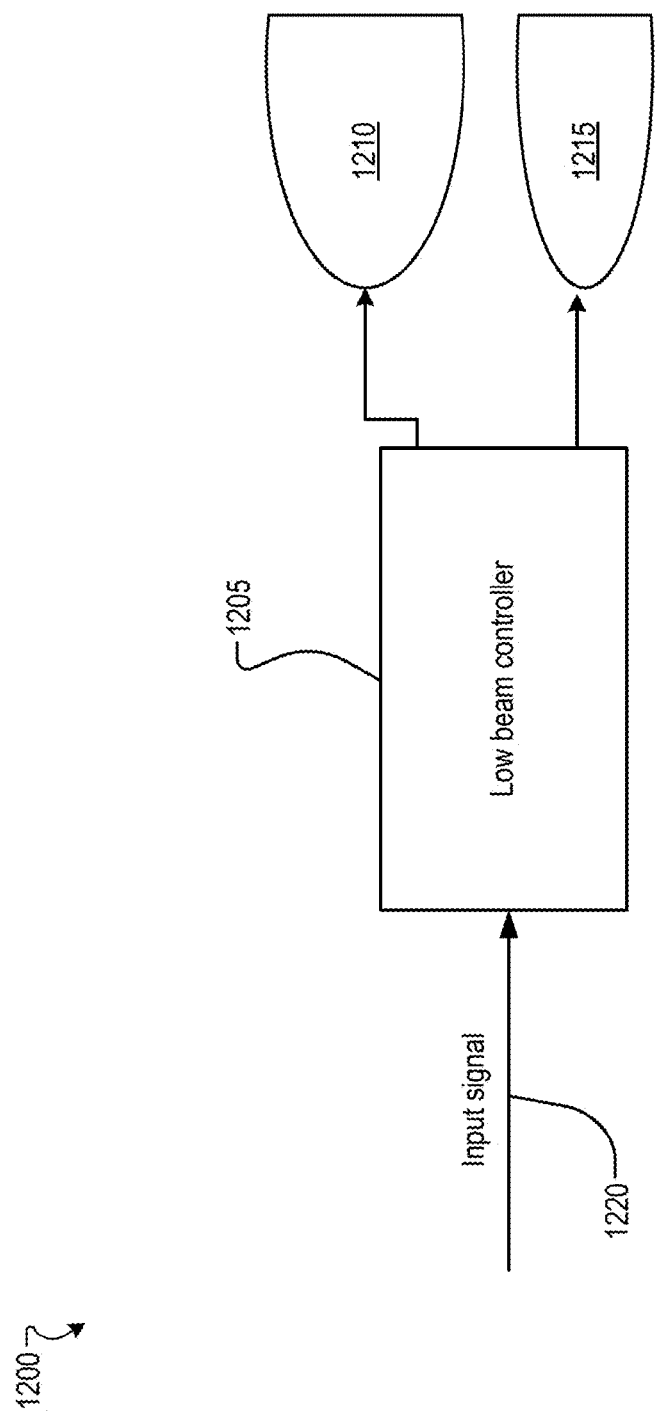
FIG. 12 illustrates a functional block diagram of a low beam headlamp assembly.

FIG. 12 illustrates a functional block diagram of a low beam headlamp assembly 1200. Low beam headlamp assembly 1200 includes a low beam controller 1205, a low beam module 1210, and a supplementary module 1215. An input signal 1220 is connected to the low beam controller 1205. The input signal 1225 can be a switch to initiate or close power to one or more pixels of the supplementary module 1215 and to the low beam module 1210. Other types of input signals 1220 are contemplated by embodiments described herein, such as a light/dark input signal.

It should be noted that while FIG. 12 illustrates low beam controller 1205 as included within low beam headlamp assembly 1200, low beam control circuit 1205 could also be located apart from low beam headlamp assembly 1200. Moreover, a single low beam control circuit 1205 can be employed for both a right and left low beam headlamp assembly such that the supplementary module 1215 and the low beam module 1210 are driven in a synchronized manner.

The input signal 1220 may be generated by a controller in response to the vehicle's turning radius and speed (i.e., based on the AFS shift). The controller includes any embedded system, computer, processor, electronic control unit (ECU), or microcontroller of the vehicle 100. In one embodiment, the controller is an ECU dedicated for controlling one or more lighting devices, for example, the low beam headlamp assembly 1200, according to embodiments disclosed herein.

Figure 13:
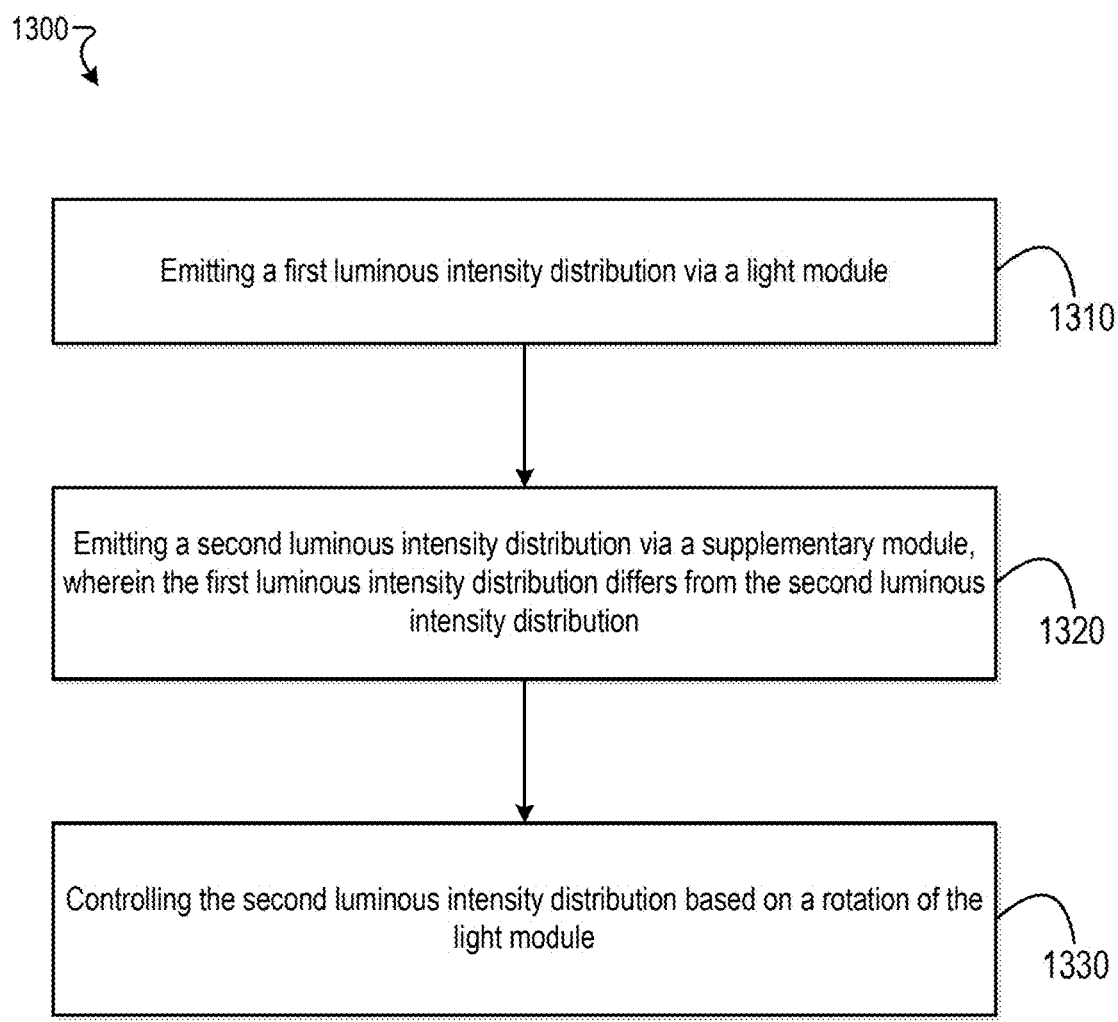
FIG. 13 is a flowchart for an exemplary method of generating a luminous intensity distribution using the supplementary module.

FIG. 13 is a flowchart for an exemplary method 1300 of generating a luminous intensity distribution using a supplementary module. In step 1310, a first luminous intensity distribution is emitted via a light module (e.g., low beam module). In one embodiment, the first luminous intensity distribution includes a maximum intensity hot spot region. In one embodiment, the first luminous intensity distribution or beam pattern may include a kink.

In step 1320, a second luminous intensity distribution is emitted via a supplementary module. The first luminous intensity distribution differs from the second luminous intensity distribution. The second luminous intensity distribution may not be uniform. The second luminous intensity distribution or beam pattern may include a plurality of zones which are controlled/illuminated independently of each other. The second luminous intensity distribution may include spots with a low light intensity or dark spots.

In step 1330, the controller (e.g., the low beam controller 1205 of FIG. 121 may adjust the position of the spots with the low light intensity or dark spots in response to detecting that the light module is rotated. For example, the controller may turn off pixels that overlap with the position of regulatory points based on the AFS rotation. In one example, an association between the pixels and the AFS rotation degree may be stored in a look-up table. The lookup table may store, for each AFS rotation the status of the zones or pixels of the supplementary module. The controller retrieves the status based on the detected AFS rotation. Then, the controller may output control signal to the headlamps based on the retrieved status of each pixel. For example, the controller may output a signal deactivating the power to the one or more light sources associated with a zone or a pixel having an off status.

Embodiments described herein provide many advantages. Embodiments described herein for the headlamp assembly provide a high luminance without exceeding regulatory maximum when using AFS. Light modules are combined with supplementary modules to selectively control the beam pattern based on the AFS rotation.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A headlamp assembly, comprising:
   a light module configured to emit a first luminous intensity distribution; and
   a supplementary module including a plurality of independently controlled pixels and configured to emit a second luminous intensity distribution which at least partially overlaps with the first luminous intensity distribution, wherein the second luminous intensity distribution varies with a rotation of the light module by selectively activating or deactivating each pixel of the plurality of independently controlled pixels based on at least a rotation angle of the light module with respect to the supplementary module.

2. The headlamp assembly of claim 1, wherein pixel of the plurality of independently controlled pixels is activated or deactivated based on the rotation angle of the light module and a location of regulatory points.

3. The headlamp assembly of claim 2, wherein a plurality of controlled pixels are non-illuminated when a plurality of controlled zones associated with the plurality of controlled pixels overlaps with the location of one or more regulatory points.

4. The headlamp assembly of claim 1, wherein the first luminous intensity distribution differs from the second luminous intensity distribution.

5. The headlamp assembly of claim 4, wherein the first luminous intensity distribution includes a maximum intensity hot spot region.

6. The headlamp assembly of claim 1, wherein the light module is adapted to generate a beam pattern with a kink.

7. The headlamp assembly of claim 6, wherein the light module is a low beam module.

8. An adaptive front-lighting system of a vehicle, comprising:
   a light module configured to generate a first beam pattern; and
   a supplementary module including a plurality of independently controlled pixels and configured to generate a second beam pattern which at least partially overlaps with the first beam pattern, wherein the second bean pattern varies with a rotation of the light module by selectively activating or deactivating each pixel of the plurality of independently controlled pixels based on at least a rotation angle of the light module with respect to the supplementary module.

9. The adaptive front-lighting system of claim 8, wherein each pixel of the plurality of independently controlled pixels is activated or deactivated based on the rotation angle of the light module and a location of regulatory points.

10. The adaptive front-lighting system of claim 9, wherein a plurality of controlled pixels are non-illuminated when a plurality of controlled zones associated with the plurality of controlled pixels overlaps with the location of one or more regulatory points.

11. The adaptive front-lighting system of claim 8, wherein an intensity of the first beam pattern differs from an intensity of the second beam pattern.

12. The adaptive front-lighting system of claim 11, wherein the first beam pattern includes a maximum intensity hot spot region.

13. The adaptive front-lighting system of claim 8, wherein the first beam pattern is a beam pattern having a kink.

14. The adaptive front-lighting system of claim 13, wherein the light module is a low beam module.

15. The adaptive front-lighting system of claim 8, wherein the first light beam is a low beam pattern.

16. A method of generating a hybrid luminous intensity distribution associated with a motor vehicle, the method comprising:

emitting a first luminous intensity distribution via a light module;

emitting a second luminous intensity distribution via a supplementary module, the supplementary module including a plurality of independently controlled pixels, the second luminous intensity distribution at least partially overlapping with the first luminous intensity distribution; and controlling each pixel of the plurality of independently controlled pixels based on a rotation of the first luminous intensity distribution.

17. The method of claim 16, wherein each pixel of the plurality of independently controlled pixels is based on a location of regulatory points.

18. The method of claim 17, wherein controlling each pixel further includes deactivating one or more pixels when a plurality of controlled zones associated with the plurality of controlled pixels overlaps with the location of one or more regulatory points.

19. The method of claim 16, wherein the first luminous intensity distribution differs from the second luminous intensity distribution.

20. The headlamp assembly of claim 1, wherein one or more pixels of the supplementary module are turned off so not to exceed a threshold associated with one or more measurement locations.

* * * * *